US010632408B2

(12) United States Patent
Duncan

(10) Patent No.: US 10,632,408 B2
(45) Date of Patent: Apr. 28, 2020

(54) REMOVABLE FILTER FOR PORTABLE FAN

(71) Applicant: Don Duncan, Wilsonville, OR (US)

(72) Inventor: Don Duncan, Wilsonville, OR (US)

(*) Notice: Subject to any disclaimer, the term of this patent is extended or adjusted under 35 U.S.C. 154(b) by 87 days.

(21) Appl. No.: 15/924,683

(22) Filed: Mar. 19, 2018

(65) Prior Publication Data
US 2019/0282943 A1 Sep. 19, 2019

(51) Int. Cl.
B01D 46/00 (2006.01)
B01D 46/54 (2006.01)
F04D 29/70 (2006.01)
B01D 46/10 (2006.01)

(52) U.S. Cl.
CPC ..... B01D 46/0006 (2013.01); B01D 46/0005 (2013.01); B01D 46/10 (2013.01); B01D 46/543 (2013.01); F04D 29/703 (2013.01); B01D 2265/028 (2013.01)

(58) Field of Classification Search
CPC ............ B01D 46/0005; B01D 46/0006; B01D 46/10; B01D 46/543; B01D 2265/028; F04D 29/703; F24F 1/0071; F24F 3/1603
See application file for complete search history.

(56) References Cited

U.S. PATENT DOCUMENTS

| 3,058,279 | A | * | 10/1962 | Metcalfe | B01D 46/10 55/495 |
| 4,781,526 | A | * | 11/1988 | Mead | B01D 46/00 248/224.7 |
| 5,221,180 | A | * | 6/1993 | Crider | F04D 29/703 403/11 |
| 5,904,744 | A | * | 5/1999 | Kagan | B01D 46/0005 55/385.1 |
| 5,912,369 | A | * | 6/1999 | Reeves | B01D 46/02 55/385.1 |
| 6,264,727 | B1 | * | 7/2001 | Elmore | B01D 46/0036 55/357 |
| 7,393,272 | B2 | * | 7/2008 | Sundet | F24F 1/0071 454/275 |
| 7,971,857 | B1 | * | 7/2011 | Mazza | B01D 46/10 261/30 |
| 2002/0007735 | A1 | * | 1/2002 | Volo | B01D 46/0005 96/134 |
| 2002/0157360 | A1 | * | 10/2002 | Wilson | B01D 46/0002 55/481 |
| 2006/0168925 | A1 | * | 8/2006 | Whittemore | B01D 46/0005 55/490 |

(Continued)

Primary Examiner — Jason M Greene
(74) Attorney, Agent, or Firm — Barry Choobin; Patent 360

(57) ABSTRACT

The various embodiments herein provide a filter assembly for a portable fan comprising a holder base and a filter. The holder base comprises a base strip attached to a body of the portable fan through a fastening mechanism. At least two base strips are connected on opposite ends of the body of the portable fan. The holder base further comprises at least two vertical stoppers, at least two sliding brackets, and at least two slots. The at least two vertical stoppers are attached at vertically opposite ends of the base strip. The at least two sliding brackets are attached long a length of the base strip. The at least two slots are provided at a suitable place on the base strip for the fastening mechanism. The filter is a semi permeable membrane fixed into the base strip through the at least two sliding brackets.

7 Claims, 3 Drawing Sheets

(56) References Cited

U.S. PATENT DOCUMENTS

2013/0340400 A1\* 12/2013 Minaeeghainipour ........................ B01D 46/0002
  55/511

\* cited by examiner

REMOVABLE FILTER FOR PORTABLE FAN

BACKGROUND

Technical Field of Invention

The embodiments herein generally relate to an accessory for a portable fan and particularly relates to a detachable filter assembly for a portable fan. The embodiments herein more particularly relate to a detachable filter assembly for filtering an inflow and outflow of air through the various sizes and shapes of portable fans.

Description of Related Art

A portable fan is of various shapes and sizes such a table fan and a box fan. The portable fans have a cage structure for housing a blade assembly and a part of motor assembly and is supported over a base stand. A major disadvantage of such fans is they have to be regularly cleansed for proper functioning. To improve maintainability of the portable fans, a plurality of prior arts has been developed.

One of such prior arts discloses one or two filters in brackets are integrated with a square or circular fan. The filters and associated brackets are provided both in the front and in the rear of the fan in one embodiment. In another embodiment, a single filter in a bracket is provided at the rear of the fan. The filter(s) can be pre-pleated and pre-activated carbon filter(s). The fan housing can include a pocket for adding an odorizing and/or deodorizing agent. A plurality of stick-on right-angled brackets having the capacity of adjustable clearance to snugly hold the filters is another embodiment. However, such filters prove difficult in installation as first the bracket has to be made of size and shape of the fan and then, the bracket has to be fixed by using a plurality of fastening mechanisms.

Also, the prior art filter assembly are bulky in nature and hence, a frequent detachment becomes a cumbersome process and maintenance cost of such filter assembly increases with time.

In the view of foregoing, there is a need for a filter assembly with easy installation over various shapes and sizes of the portable fans. Also, there is a need for a filter assembly with least complex mounting mechanism to reduce a time consumption during mounting, a maintenance cost and replacement cost.

The above-mentioned shortcomings, disadvantages and problems are addressed herein, as detailed below.

SUMMARY OF THE INVENTION

The primary object of the embodiments herein is to provide a filter assembly for easy installation over various shapes and sizes of the portable fans.

Another object of the embodiment herein is to provide a filter assembly with least complex mounting mechanism to reduce a time consumption during mounting, a maintenance cost and replacement cost.

The various embodiments herein provide a filter assembly for a portable fan comprising a holder base and a filter. The holder base comprises a base strip attached to a body of the portable fan through a fastening mechanism. At least two base strips are connected on opposite ends of the body of the portable fan. The holder base further comprises at least two vertical stoppers, and at least two sliding brackets. The at least two vertical stoppers are attached at vertically opposite ends of the base strip. The at least two sliding brackets are attached long a length of the base strip. The filter is a semi permeable membrane fixed into the base strip through the at least two sliding brackets. The at-least two slots comprise a peel-off cover which is removed for exposing the fastening mechanism primarily comprising a Velcro strip. After peeling-off, the base strip is pasted or stuck to the surface of the portable fan through the fastening mechanism.

According to one embodiment of the present invention, the at least two vertical stoppers have an angular degree of movement. Each vertical stopper swings open to allow a sliding in of the filter.

According to one embodiment of the present invention, each vertical stopper is extendible in an opposite direction with respect to each other to allow a fixation of a plurality of sizes of filters.

According to one embodiment of the present invention, each sliding bracket is extendible in radial directions with respect to the base strip to allow a fixation of a plurality of filters with varying size and thickness. The at least two sliding brackets allows a fixation of the filter sliding through the length of the base strip.

According to one embodiment of the present invention, each sliding has an angular degree of movement in an outwards direction with respect to the base strip to allow a fixation of the filter by radial aligning and placement over the base strip.

According to one embodiment of the present invention, the fastening mechanism comprises a Velcro strip or a magnetic strip or a vacuum strip or a combination of them.

According to one embodiment of the present invention, the base strip is flexible in nature and is primarily made up of an elastomeric material.

According to one embodiment of the present invention, a plurality of base strips is cascaded linearly to house different sizes of filters.

According to one embodiment of the present invention, a plurality of base strips is cascaded in different formations to house different shapes of filters. The different formation comprises a rectangle, a square, a circle, an oval, an ellipse, and a polygon.

These and other aspects of the embodiments herein will be better appreciated and understood when considered in conjunction with the following description and the accompanied drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanied drawings in which.

DETAILED DESCRIPTION OF THE DRAWINGS

In the following detailed description, a reference is made to the accompanied drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1A:
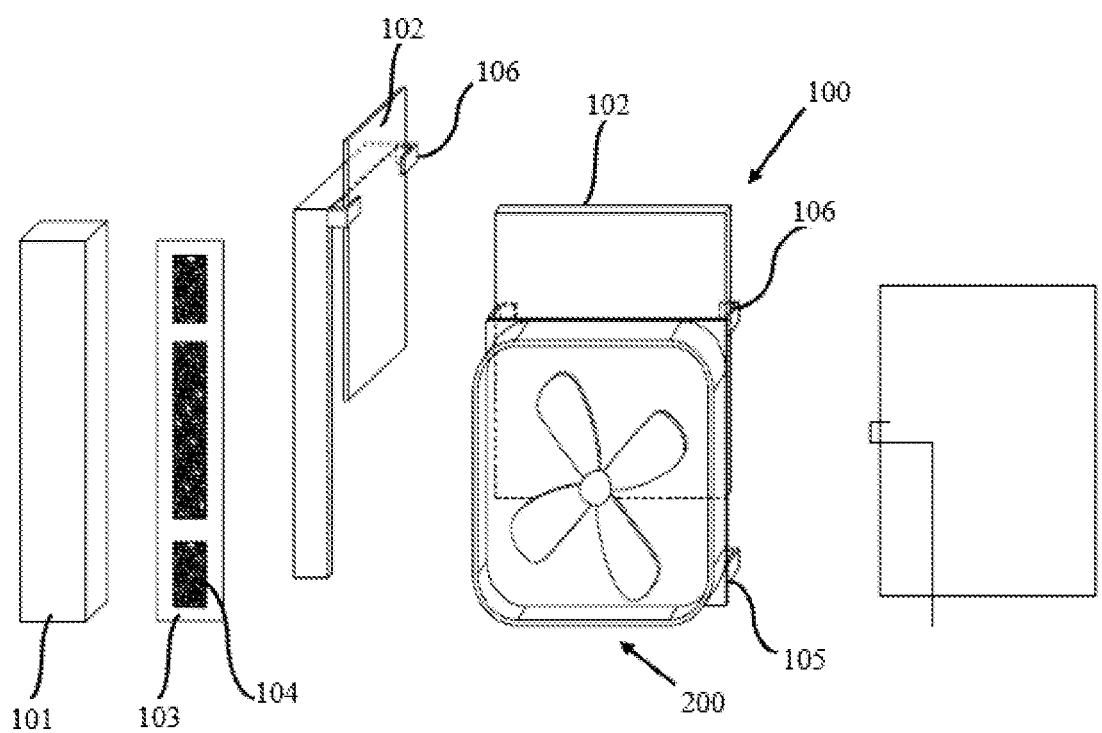
FIG. 1a-1c illustrates a de-assembled view, a side view and a back view of a filter assembly attached to a portable fan through the holder base, according to one embodiment herein.
Figure 1B:
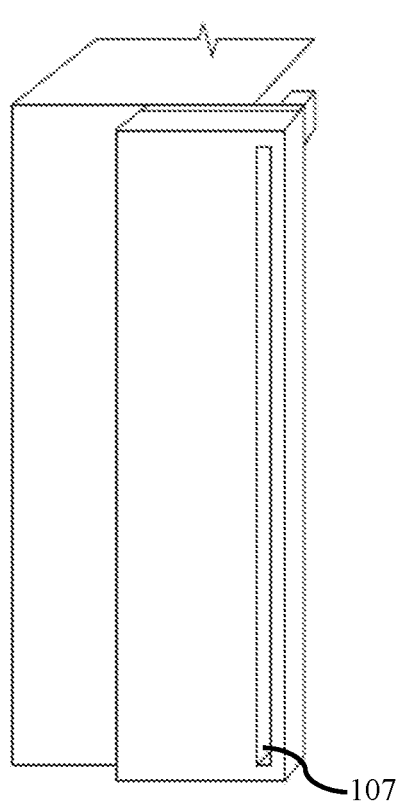
Figure 1C:
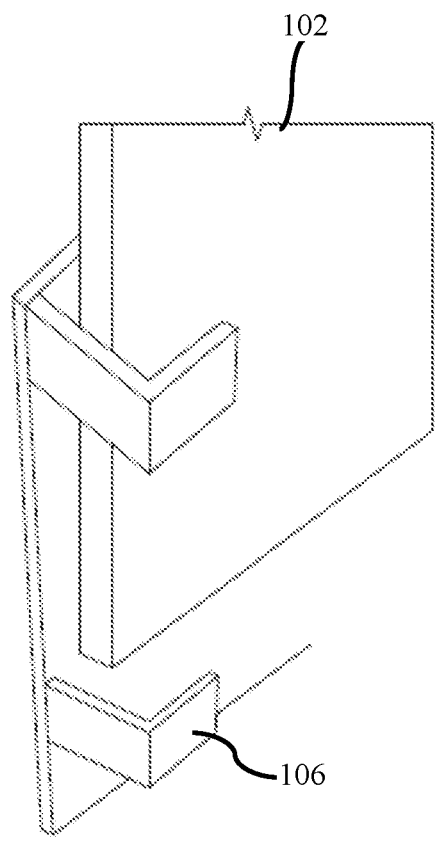
Figure 1D:
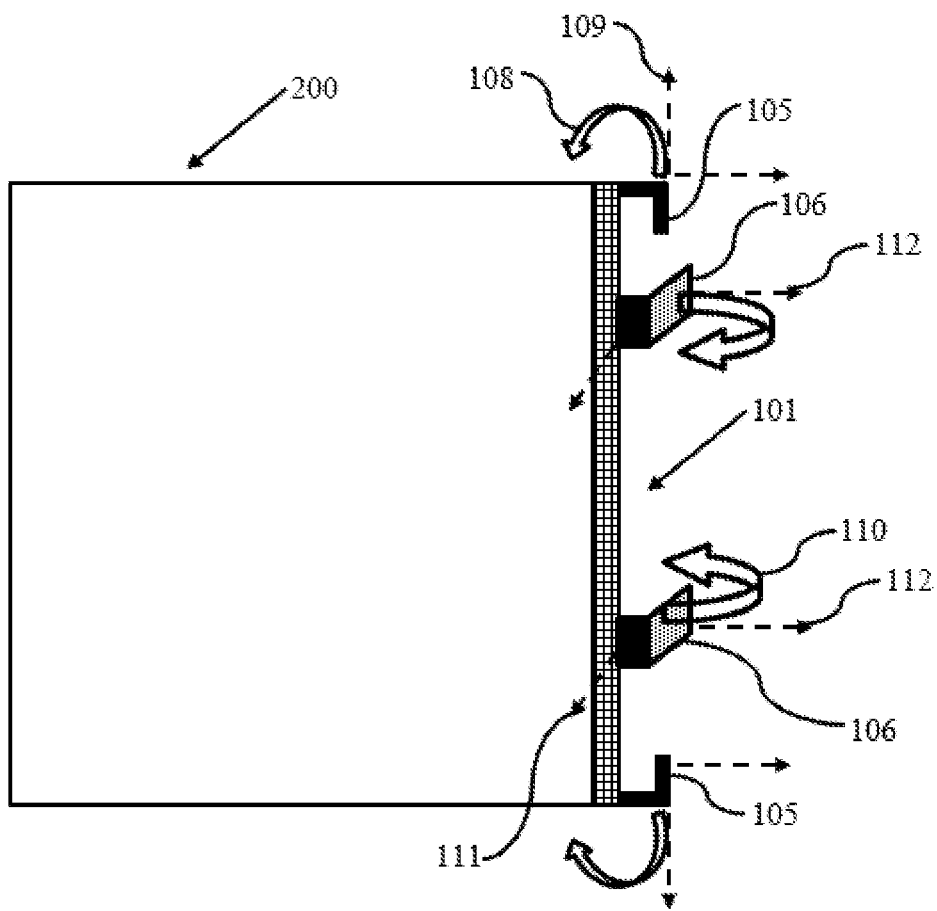
FIG. 1d illustrates a side view of a filter assembly attached to a portable fan with a degree of movement of each sliding bracket and each vertical stopper, according to one embodiment herein.

With respect to FIG. 1a-1d, the filter assembly 100 for the portable fan 200 comprising a holder base 101 and a filter 102. The holder base 101 comprises a base strip 103 attached to a body of the portable fan 200 through a fastening mechanism 104. At least two base strips 103 are connected on opposite ends of the body of the portable fan 200. The holder base 101 further comprises at least two vertical stoppers 105, at least two sliding brackets 106, and at least two slots for fastening mechanisms 107. The at least two vertical stoppers 105 are attached at vertically opposite ends of the base strip 103. The at least two sliding brackets 106 are attached along a length of the base strip 103. The filter 102 is a semi permeable membrane fixed into the base strip through the at least two sliding brackets 106. The at-least two slots 107 comprise a peel-off cover which is removed for exposing the fastening mechanism primarily comprising a Velcro strip. After peeling-off, the base strip is pasted or stuck to the surface of the portable fan through the fastening mechanism.

Each vertical stopper 105 swings open in an outward direction 108 with respect to the base strip 103. The swinging movement of the at least vertical stoppers 105 forms a clipping action to hold the filter in a preferred against the body of the portable fan. The at least two vertical stoppers are further extended outwards in a linear manner 109 that creates an allowance for different sizes of the filter to be fixed using same holder base. The linearly outward extension of each vertical stopper is held by a spring force caused by a compact spring assembly housed within the body of the vertical stoppers and one end of the spring assembly is attached to the base strip.

Also, each sliding bracket 106 swing open in the outward direction 110 with respect to the base strip 103. The swinging movement of the at least vertical stoppers 106 forms a clipping action to hold the filter in a preferred against the body of the portable fan. The at least two sliding brackets are further extended outwards in a linear manner 111 that creates an allowance for different sizes of the filter to be fixed using same holder base. The linearly outward extension of each vertical stopper is held by a spring force caused by a compact spring assembly housed within the body of the vertical stoppers and one end of the spring assembly is attached to the base strip.

Each vertical stopper and each sliding bracket are extendible in a radially outwards direction 112 with respect to the base strip to house a plurality of filters of varying thickness, thus same holder base is used for filters of various thickness.

According to one embodiment herein, the extensions and angular movement of the at least vertical stoppers and the at least two sliding brackets are optional in nature and are facilitated as per user preference.

According to one embodiment herein, the plurality of holder bases are cascaded to form various holding shapes such as a rectangle, a square, a circle, an oval, an ellipse, and a polygon. The cascading of the holder bases allows the filter assembly to be used in various designs of portable fans, thus increasing a utility range of the filter assembly.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A filter assembly for a portable fan comprising:
   a holder base, wherein the holder base comprises a base strip attached to a body of the portable fan through a fastening mechanism, and wherein said base strip is flexible in nature and is primary made up of an elastomeric material, and wherein at least two base strips are connected on opposite ends of the body of the portable fan, wherein the holder base further comprises:
   at least two vertical stoppers, wherein the at least two vertical stoppers are attached at vertically opposite ends of the base strip, said vertical stoppers have an angular degree of movement and each vertical stopper swings open to allow a sliding in of the filter;
   at least two sliding brackets, wherein the at least two sliding brackets are attached along a length of the base strip;
   at least two slots, wherein the at least two slots are provided at a suitable place on the base strip for the fastening mechanism;
   a filter, wherein the filter is a semi permeable membrane fixed into the base strip through the at least two sliding brackets.

2. The filter assembly according to claim 1, wherein each vertical stopper is extendible in an opposite direction with respect to each other to allow a fixation of a plurality of sizes of filters.

3. The filter assembly according to claim 1, wherein each sliding bracket is extendible in radial directions with respect to the base strip to allow a fixation of a plurality of filters with varying size and thickness, wherein the at least two sliding brackets allows a fixation of the filter sliding through the length of the base strip.

4. The filter assembly according to claim 1, wherein each sliding bracket has an angular degree of movement in an outwards direction with respect to the base strip to allow a fixation of the filter by radial aligning and placement over the base strip.

5. The filter assembly according to claim 1, wherein the fastening mechanism includes hook and loop.

6. The filter assembly according to claim 1, wherein a plurality of base strips is cascaded linearly to house different sizes of filters.

7. The filter assembly according to claim 1, wherein a plurality of base strips is cascaded in different formations to house different shapes of filters, wherein the different formation comprises a rectangle, a square, a circle, an oval, an ellipse, and a polygon.

* * * * *